(12) United States Patent
Niizuma

(10) Patent No.: US 9,467,005 B2
(45) Date of Patent: Oct. 11, 2016

(54) UNDERWATER POWER SUPPLY SYSTEM

(71) Applicant: IHI Corporation, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 0 days.

(21) Appl. No.: 14/484,757

(22) Filed: Sep. 12, 2014

(65) Prior Publication Data

US 2015/0002092 A1 Jan. 1, 2015

Related U.S. Application Data

(63) Continuation of application No. PCT/JP2013/060703, filed on Apr. 9, 2013.

(30) Foreign Application Priority Data

Apr. 11, 2012 (JP) ................................ 2012-090093

(51) Int. Cl.
*H02J 7/00* (2006.01)
*H01F 38/00* (2006.01)
(Continued)

(52) U.S. Cl.
CPC ............... *H02J 7/025* (2013.01); *B60L 5/005* (2013.01); *B60L 11/1824* (2013.01); *B60M 7/00* (2013.01); *B63G 8/001* (2013.01); *H02J 5/005* (2013.01); *B60L 2200/32* (2013.01); *B60L 2230/22* (2013.01); *B60L 2260/32* (2013.01); *B63G 2008/002* (2013.01); *Y02T 10/7005* (2013.01);
(Continued)

(58) Field of Classification Search
CPC ...... H02J 7/0025; H02J 5/005; B63G 8/001; H01F 38/14

USPC ........................... 320/108; 307/104; 114/244
See application file for complete search history.

(56) References Cited

U.S. PATENT DOCUMENTS 3,417,566 A * 12/1968 Gould .................... B23B 45/046
  122/247
3,769,521 A * 10/1973 Caldwell ................. C23F 13/04
  166/351

(Continued)

FOREIGN PATENT DOCUMENTS

CN 101924583 A 12/2010
CN 102118068 A 7/2011
(Continued)

OTHER PUBLICATIONS

International Search Report and Written Opinion mailed May 14, 2013 in corresponding PCT International Application No. PCT/JP2013/060703.
(Continued)

*Primary Examiner* — M'Baye Diao
(74) *Attorney, Agent, or Firm* — Ostrolenk Faber LLP

(57) ABSTRACT

An underwater power supply system is provided with an ascending/descending station that ascends and descends underwater between the water depth at which an underwater moving body works and the vicinity of the water surface, and a charging station that supplies electrical power wirelessly to the ascending/descending station in the vicinity of the water surface. At the aforementioned water depth, the underwater moving body moves adjacent to the ascending/descending station, and electrical power is supplied wirelessly from the ascending/descending station to the underwater moving body.

9 Claims, 3 Drawing Sheets

(51) Int. Cl.
B63G 8/42 (2006.01)
H02J 7/02 (2016.01)
B60M 7/00 (2006.01)
B60L 5/00 (2006.01)
H02J 5/00 (2016.01)
B63G 8/00 (2006.01)
B60L 11/18 (2006.01)

(52) U.S. Cl.
CPC .............. Y02T 10/7088 (2013.01); Y02T 90/12 (2013.01); Y02T 90/121 (2013.01); Y02T 90/14 (2013.01)

(56) References Cited

U.S. PATENT DOCUMENTS

| | | | | |
|---|---|---|---|---|
| 5,301,096 | A * | 4/1994 | Klontz | H01F 38/14 320/108 |
| 5,737,279 | A * | 4/1998 | Carter | G10K 11/006 310/337 |
| 6,257,162 | B1 * | 7/2001 | Watt | B63G 8/001 114/221 R |
| 6,304,289 | B1 * | 10/2001 | Sakai | B63C 11/42 348/81 |
| 6,764,373 | B1 | 7/2004 | Osawa et al. | 446/175 |
| 7,206,257 | B1 * | 4/2007 | Meng | F41H 13/0081 361/1 |
| 2010/0104031 | A1 | 4/2010 | Lacour | 375/258 |
| 2013/0099592 | A1 | 4/2013 | Abe | 307/104 |

FOREIGN PATENT DOCUMENTS

| | | |
|---|---|---|
| GB | 2 453 645 A | 4/2009 |
| JP | A-02-032721 | 2/1990 |
| JP | 5-61545 | 3/1993 |
| JP | 5-294568 | 11/1993 |
| JP | 07-223589 | 8/1995 |
| JP | 8-60645 | 3/1996 |
| JP | 08-505277 | 6/1996 |
| JP | 9-188295 | 7/1997 |
| JP | 2001-125641 | 5/2001 |
| JP | 2002-249285 | 9/2002 |
| JP | 2004-166459 | 6/2004 |
| JP | 2005-210843 | 8/2005 |
| JP | 2010-523030 | 7/2010 |
| JP | 2011-229244 | 11/2011 |
| JP | 2012-16125 | 1/2012 |
| KR | 2011-0012324 A | 2/2011 |
| WO | WO 94/09558 A1 | 4/1994 |
| WO | WO 01/21478 A1 | 3/2001 |

OTHER PUBLICATIONS

Extended European Search Report issued Nov. 9, 2015 in corresponding EP Application No. 13775229.1.
Stokey R et al: "A docking system for REMUS, an autonomous underwater vehicle", Oceans '97. MTS/IEEE Conference Proceedings Halifax NS, Canada Oct. 6-9, 1997, New York, NY, USA, IEEE, US, vol. 2, Oct. 6, 1991, pp. 1132-1136.
Office Action dated Oct. 16, 2015 issued in corresponding Japanese Patent Application No. 2012-090093 with English translation.

* cited by examiner

UNDERWATER POWER SUPPLY SYSTEM

This application is a continuation application based on a PCT Patent Application No. PCT/JP2013/060703, filed Apr. 9, 2013, whose priority is claimed on Japanese Patent Application No. 2012-090093, filed Apr. 11, 2012. The contents of both the PCT Application and the Japanese Application are incorporated herein by reference.

TECHNICAL FIELD

The present invention relates to an underwater power supply system that supplies electrical power underwater to an underwater moving body.

BACKGROUND ART

The term 'underwater moving body' may refer to an underwater vehicle that cruises underwater, an underwater robot that is used underwater, or an underwater exploration robot that explores the seafloor.

This type of underwater moving body is normally provided with a rechargeable battery (i.e., a secondary battery) as a motive power source, and cruises or travels underwater so that it can perform a variety of tasks (i.e., missions).

Conventionally, a means described, for example, in Patent Documents 1 and 2 is disclosed as a means of supplying electrical power underwater.

Patent Document 1 discloses a power-supplying device (for example, an underwater traveling robot) that supplies electrical power wirelessly via an electromagnetic induction device to a secondary battery that is mounted in an undersea facility.

Patent Document 2 discloses a system in which a marine robot that moves underwater has a transmitter, and a seabed facility (for example, a stake) that has been driven into the seabed has a receiver, and wireless power supplying and bi-directional communication are performed between the transmitter and the receiver.

CITATION LIST

Patent Documents

Patent Document 1: Japanese Unexamined Patent Application, First Publication No. 2004-166459
Patent Document 2: Published Japanese Translation No. 2010-523030 of PCT International Publication

SUMMARY OF INVENTION

Technical Problem

In many cases, underwater moving bodies such as underwater vehicles, underwater robots, and underwater exploration robots operate in the vicinity of the bottom of water in order to perform underwater missions (for example, seabed exploration using sonar).

In contrast, the rechargeable batteries (i.e., secondary batteries) that are mounted in underwater moving bodies are normally small in size and also small in capacity and, therefore, have a short usable time so that they must be recharged frequently.

As in the embodiments described in Patent Document 1, if electrical power is supplied from the sea surface to a power-supplying device (for example, an underwater travelling robot) via a power supply cable, namely, if a power supply station is provided underwater, it is necessary to lay from land or from the sea surface a thick power supply cable that has a covering that can prevent the ingress of water, and can withstand rocks and drifting objects. In this case, large-scale equipment is needed in order to support the weight of the power supply cable. Installing such equipment is costly, and the installation may also have a considerable effect on the natural environment.

As is the case in Patent Document 2, if a marine robot moves up to or down from the vicinity of the water surface in order to recharge its rechargeable batteries, the time that the marine robot is able to devote to its actual mission is shortened so that there is a decrease in the operating efficiency.

The present invention was conceived in order to solve the above-described problems. Namely, it is an object of the present invention to provide an underwater power supply system that, when either one or a plurality of underwater moving bodies work in deep water, is able to supply electrical power underwater to the underwater moving bodies without the underwater moving bodies having to rise to the vicinity of the water surface.

Solution to Problem

The present invention is an underwater power supply system that supplies electrical power underwater to one or a plurality of underwater moving bodies, and that includes: an ascending/descending station that ascends and descends underwater between a water depth at which the underwater moving body works and the vicinity of the water surface; and a charging station that supplies electrical power wirelessly to the ascending/descending station in the vicinity of the water surface, in which, at the water depth, the underwater moving body moves adjacent to the ascending/descending station, and electrical power is supplied wirelessly from the ascending/descending station to the underwater moving body.

Advantageous Effects of Invention

According to the present invention, the ascending/descending station ascends and descends underwater between the water depth at which underwater moving body works and the vicinity of the water surface, the underwater moving body moves adjacent to the ascending/descending station at the aforementioned water depth, and electrical power is then supplied wirelessly from the ascending/descending station to the underwater moving body. As a consequence, one or a plurality of underwater moving bodies only move at the water depth at which the underwater moving bodies work (for example, in the vicinity of the bottom of water), and they are able to alternate solely between performing their mission and recharging without having to ascend to the vicinity of the surface. Accordingly, the operating efficiency of the underwater moving body is improved.

DESCRIPTION OF EMBODIMENTS

Hereinafter, preferred embodiments of the present invention will be described in detail based on the attached drawings. Note that the same descriptive symbols are used for portions that are the same in each of the drawings, and duplicated description thereof is omitted.

Figure 1:
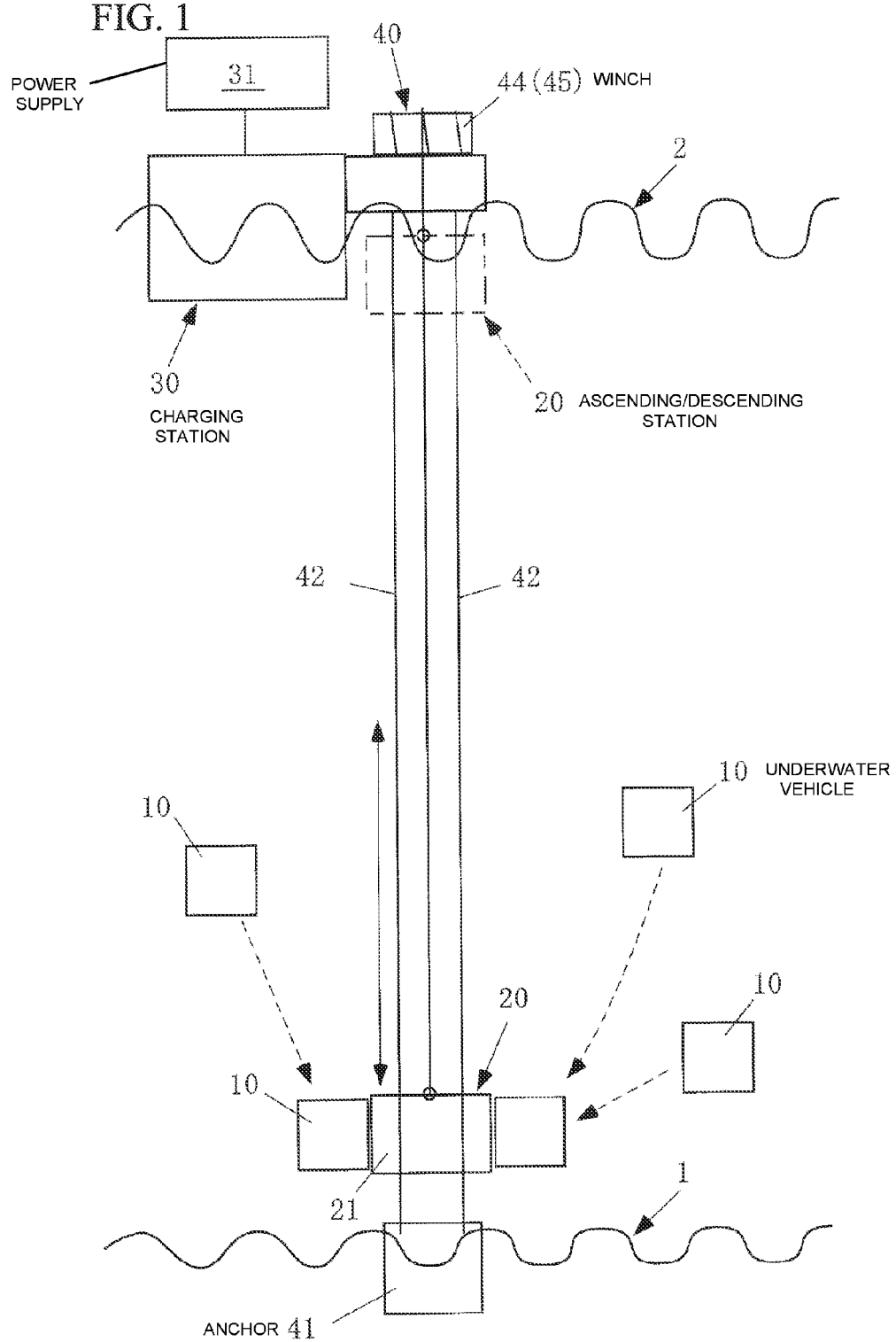
FIG. 1 is a view showing the overall structure of the present invention.

FIG. 1 shows the overall structure of the present invention. In FIG. 1, the present invention is an underwater power supply system that supplies electrical power underwater to one or a plurality of underwater moving bodies 10, and is provided with an ascending/descending station 20 and a charging station 30.

The underwater moving bodies 10 are, for example, underwater vehicles, underwater robots, or underwater exploration robots.

The ascending/descending station 20 ascends and descends underwater between the water depth (for example, the bottom of water 1) at which the underwater moving bodies 10 work and the vicinity of the water surface 2, and supplies electrical power wirelessly underwater at that water depth to the underwater moving bodies 10.

The ascending/descending station 20 has an ascending/descending apparatus 40 by which the ascending/descending station 20 ascends and descends underwater.

In this example, the ascending/descending apparatus 40 has an anchor 41 that is positioned on the bottom of water 1, guide cables 42 that link the anchor 41 to the charging station 30 and extend in a vertical direction, and a raising/lowering device 44 that raises or lowers a main body 21 of the ascending/descending station 20 underwater.

The anchor 41 may either be fixed to the bottom of water 1, or may simply be held stationary on the bottom of water 1.

In this example, the raising/lowering device 44 is a hoisting winch 45 that winds up or unwinds down the main body 21 of the ascending/descending station 20 in a state where the main body 21 is suspended from the hoisting winch 45.

By employing this structure, even if the horizontal position of the charging station 30 relative to the anchor 41 is changed by waves or tidal currents, simply by raising or lowering the main body 21 of the ascending/descending station 20 underwater, it is possible to place the ascending/descending station 20 in a desired location in the vicinity of the anchor 41 that is positioned on the bottom of water 1.

Note that the raising/lowering device 44 is not limited to the structure described in this example, and may also take the form of for example, a floatation air tank and a pump that supplies water to the interior of this floatation air tank.

Moreover, it is also possible to omit the anchor 41 and the guide cables 42, and provide a propulsion device (for example, a screw propeller and rudders, or a water injection system) in the ascending/descending station 20. In this case, the propulsion device is used to propel the ascending/descending station 20 to a previously set position.

In this case, a signal emitter that outputs a signal indicating the previously set position may be fixed to the bottom of water 1, and the propulsion device of the ascending/descending station 20 may be controlled based on this signal received therein.

The charging station 30 supplies electrical power wirelessly to the ascending/descending station 20 in the vicinity of the water surface 2. The charging station 30 is either installed on-land or is positioned on the water surface (the sea surface). The charging station 30 is connected to an external electrical power supply 31 and receives electrical power from the external electrical power supply 31.

The external electrical power supply 31 may be, for example, a commercial power supply, a solar power generating facility, or a wind power generating facility.

Figure 2:
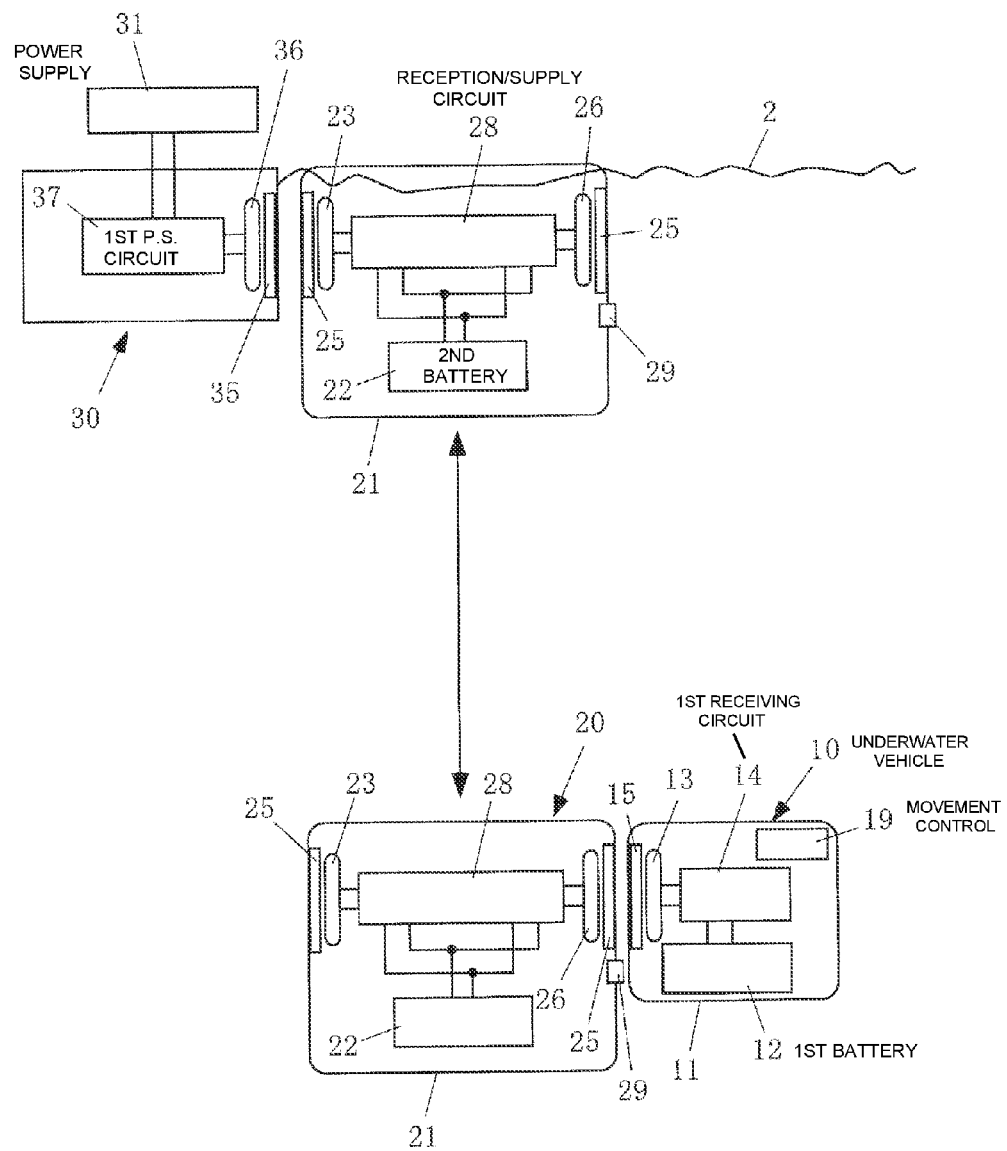
FIG. 2 is a view showing a first embodiment of the present invention.

FIG. 2 shows a first embodiment of the present invention.

In this drawing, each underwater moving body 10 has a first rechargeable battery 12, a first power-receiving coil 13, a first power-receiving circuit 14 that supplies electrical power from the first power-receiving coil 13 to the first rechargeable battery 12, and a moving device (not shown) by which the underwater moving body 10 moves underwater.

The first rechargeable battery 12 is a secondary battery such as a lithium ion battery or a lead battery or the like.

The moving device provided in each underwater moving body 10 may be realized, for example, by a screw propeller and rudders, a water injection system, wheels, a crawler, or a walking leg mechanism.

A main body 11 of each underwater moving body 10 is a pressure-resistant vessel that is able to withstand the water pressure at the depth at which the underwater moving bodies 10 work. Moreover, the first power-receiving coil 13 is provided inside of a magnetic field transmissive component 15 made of a material that has sufficient watertightness and pressure resistance to withstand the water pressure at the depth at which the underwater moving bodies 10 work and that allows an electromagnetic field that is used for wireless power supplying to pass through it. The magnetic field transmissive component 15 may be made, for example, of FRP.

The charging station 30 has a first power-supplying coil 36, and a first power-supplying circuit 37 that is connected to the external electrical power supply 31 and drives the first power-supplying coil 36 in a voltage/current waveform that is suitable for a wireless power supply.

A main body of the charging station 30 is a ship body or a floating body that is positioned in the vicinity of the water surface 2, or a fixed pier that extends from the land over the water.

The first power-supplying coil 36 of the charging station 30 is provided inside of a magnetic field transmissive component 35 made of a material that has sufficient watertightness and pressure resistance to withstand the water pressure at the position of the charging station 30 and that allows an electromagnetic field that is used for wireless power supplying to pass through it. The magnetic field transmissive component 35 may be made, for example, of FRP.

The ascending/descending station 20 has a second rechargeable battery 22, a second power-receiving coil 23, a second power-supplying coil 26, and a power-reception/power-supply circuit 28.

The second rechargeable battery 22 is a secondary battery such as a lithium ion battery, a lead battery or the like.

The power-reception/power-supply circuit 28 supplies electrical power from the second power-receiving coil 23 to the second rechargeable battery 22, and is also connected to the second rechargeable battery 22 and drives the second power supply coil 26 in a voltage/current waveform that is suitable for a wireless power supply.

The main body 21 of the ascending/descending station 20 is a pressure-resistant vessel that is able to withstand the water pressure at the depth at which the underwater moving bodies 10 work. Moreover, the second power-receiving coil 23 and the second power-supplying coil 26 are provided inside of a magnetic field transmissive component 25 made of a material that has sufficient watertightness and pressure resistance to withstand the water pressure at the depth at which the underwater moving bodies 10 work and that allows an electromagnetic field used for wireless power supplying to pass through it. The magnetic field transmissive component 25 may be made, for example, of FRP.

In FIG. 2, the ascending/descending station 20 is provided with a signal emitter 29 that outputs a signal indicating the position of the second power-supplying coil 26.

This signal is, for example, an acoustic signal, but may, however, be an optical signal.

Moreover, in this example, each underwater moving body 10 is provided with a movement control device 19 that makes the underwater moving body 10 move to a predetermined power-receiving position relative to the ascending/descending station 20. The movement control device 19 receives the signal from the signal emitter 29, and controls the moving device such that the first power-receiving coil 13 is positioned at a previously set distance from and opposite the second power-supplying coil 26 so that the first power-receiving coil 13 and the second power-supplying coil 26 together form an electromagnetic coupling circuit.

Figure 3:
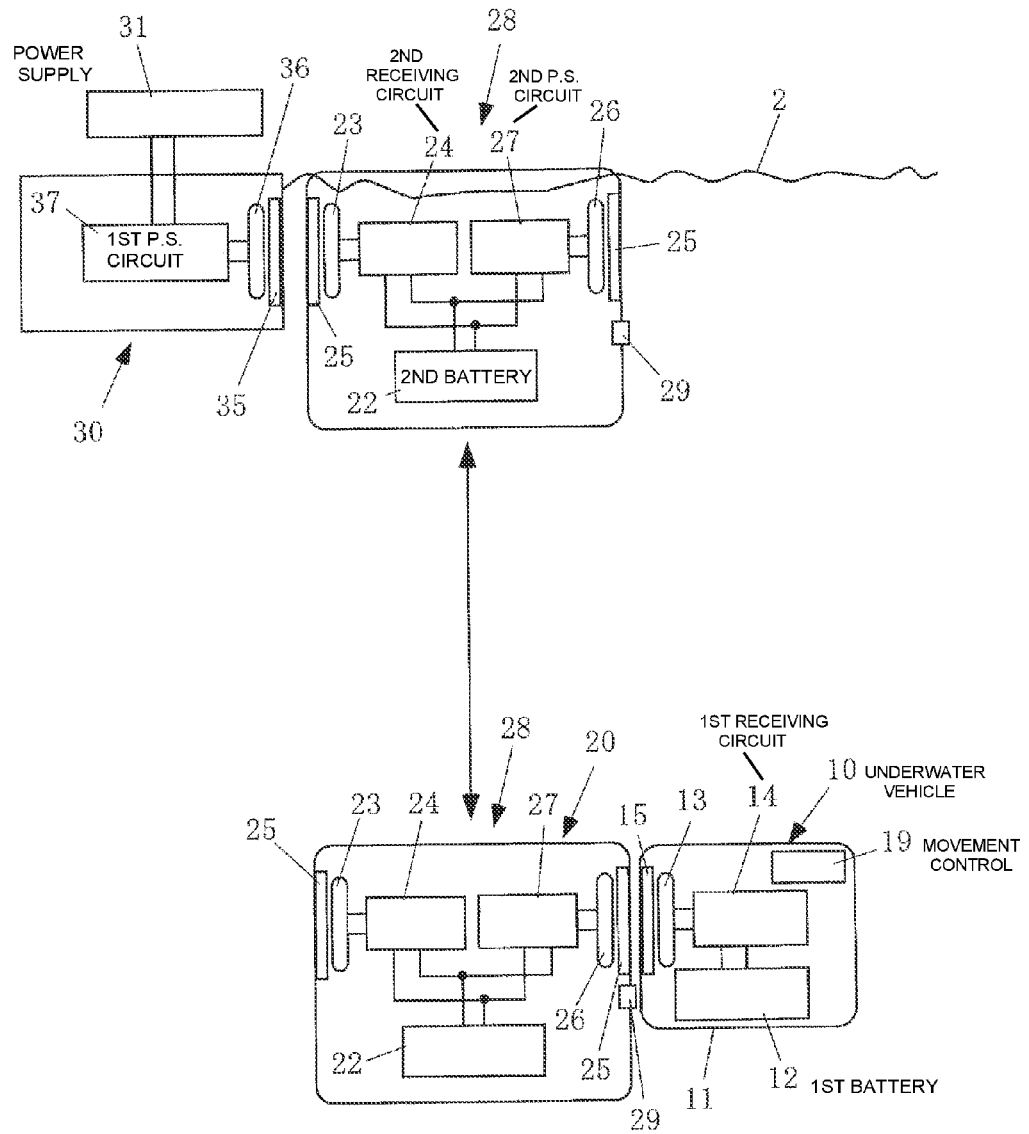
FIG. 3 is a view showing a second embodiment of the present invention.

FIG. 3 shows a second embodiment of the present invention.

In this example, the power-reception/power-supply circuit 28 is realized by a second power-receiving circuit 24 that supplies electrical power from the second power-receiving coil 23 to the second rechargeable battery 22, and a second power-supplying circuit 27 that is connected to the second rechargeable battery 22 and drives the second power-supplying coil 26 in a voltage/current waveform that is suitable for a wireless power supply.

The remainder of the structure is the same as in the first embodiment.

In FIG. 2 and FIG. 3, the first power-receiving coil 13 of each underwater moving body 10 is an induction coil that receives a wireless power supply from the above-described second power-supplying coil 26, and is provided at a height (i.e., position) on one side surface of the underwater moving body 10 such that it is opposite the ascending/descending station 20 when it is positioned at the predetermined power-receiving position (see above) relative to the ascending/descending station 20. This first power-receiving coil 13 wirelessly receives AC power via electromagnetic induction that is based on an AC magnetic field generated by the second power-supplying coil 26, and outputs it to the first power-receiving circuit 14. The first power-receiving circuit 14 is a power conversion circuit that converts the AC power input from the first power-receiving coil 13 into DC power, and then charges the first rechargeable battery 12 by supplying the converted DC power to the first rechargeable battery 12.

The power-reception/power-supply circuit 28 (as well as the second power-receiving circuit 24 and the second power-supplying circuit 27) of the ascending/descending station 20 is a power adjustment circuit that regulates the charging of the second rechargeable battery 22 from the second power-receiving coil 23, and the supplying of power to the second power-supplying coil 26 from the second rechargeable battery 22 (i.e., the discharging of the second rechargeable battery 22).

The power-reception/power-supply circuit 28 (as well as the second power-receiving circuit 24 and the second power-supplying circuit 27) adjusts, for example, the DC power supplied from the second power-receiving coil 23 at a constant current value and outputs it as charging power to the second rechargeable battery 22, and, additionally, regulates the upper-limit value of the DC power (i.e., discharge power) supplied from the second rechargeable battery 22 and outputs it to the second power-supplying coil 26.

The second rechargeable battery 22 is charged with the DC power supplied from the second power-receiving coil 23, and discharges its accumulated power (i.e., DC power) by supplying it to the second power-supplying coil 26.

The first power-supplying circuit 37 of the charging station 30 converts the AC power or DC power supplied from the external electrical power supply 31 into AC power having a voltage/current waveform that is suitable for a wireless power supply, and then outputs it to the first power-supplying coil 36. The first power-supplying coil 36 generates an induction magnetic field based on the AC power supplied from the first power-supplying circuit 37, and supplies the AC power to the ascending/descending station 20 via this induction magnetic field. Moreover, as is shown in the drawings, the first power-supplying coil 36 is provided on the side surface of the main body of the charging station 30 such that it is opposite the second power-receiving coil 23.

The above-described underwater power supply system operates, for example, in the following manner.

(1) The ascending/descending station 20 ascends as far as the vicinity of the surface 2, and the second rechargeable battery 22 mounted inside the ascending/descending station 20 is charged via wireless power supply from the charging station 30. The ascending/descending station 20 then descends to the depth at which the underwater moving body 10 works (for example, the vicinity of the bottom of water 1).

(2) Once the ascending/descending station 20 has descended, the underwater moving body 10 moves adjacent to the ascending/descending station 20 and charges the first rechargeable battery 12 mounted inside the underwater moving body 10 via wireless power supply from the ascending/descending station 20. After this charging is complete, the underwater moving body 10 executes a predetermined mission.

(3) Once the second rechargeable battery 22 inside the ascending/descending station 20 has discharged its power, the ascending/descending station 20 ascends to the water surface.

By repeating the above-described (1) to (3), the underwater moving body 10 only has to move in the water depth where it works (for example in the vicinity of the bottom of water 1). Because of this, the underwater moving body 10 is able to alternate between performing its mission and recharging its battery, and does not need to ascend to the vicinity of the water surface 2. As a consequence, the operating efficiency of the underwater mobile body 10 is improved.

If there are a plurality of underwater moving bodies 10, then the following two operations are possible.

(1) The plurality of underwater moving bodies 10 move adjacent to the ascending/descending station 20 in sequence, and are charged in sequence by the ascending/descending station 20.

(2) A plurality of the second power-supplying coils 26 are provided in the ascending/descending station 20. The plurality of underwater moving bodies 10 move adjacent to the ascending/descending station 20, and the first rechargeable batteries 12 inside each of the underwater moving bodies 10 are charged via wireless power supply from the plurality of second power-supplying coils 26.

In the operation described above in (2), in the case of the second embodiment, it is desirable for the same number of second power-supplying circuits 27 as the number of second power-supplying coils 26 to be provided, and for electrical power to be supplied from one of the second power-supplying circuits 27 to one of the second power-supplying coils 26 respectively.

In the above-described embodiments, the first power-receiving coil 13 is provided on the side surface of the underwater moving body 10, the second power-supplying coil 26 and second power-receiving coil 23 are provided on the side surfaces of the ascending/descending station 20, and the first power-supplying coil 36 is provided on the side surface of the charging station 30. However, it is also possible for these to be provided in positions other than the side surfaces provided that it is possible for an electromagnetic coupling circuit that is suitable for a wireless power supply to be achieved at such positions between the power-receiving coil and the power-supplying coil.

For example, it is also possible for the first power-receiving coil 13 to be provided on the top surface of the underwater moving body 10, and for the second power-supplying coil 26 to be provided on the bottom surface of the ascending/descending station 20. In this case, the underwater moving body 10 moves adjacent to the underside of the ascending/descending station 20, and the first rechargeable battery 12 inside the underwater moving body 10 is charged via wireless power supply from the ascending/descending station 20.

Moreover, it is also possible, for example, for the second power-receiving coil 23 to be provided on the top surface of the ascending/descending station 20, and for the first power-supplying coil 36 to be provided on the bottom surface of the charging station 30. In this case, the charging station 30 or the ascending/descending apparatus 40 are provided with a suitable shape and configuration such that when the ascending/descending station 20 has ascended, the ascending/descending station 20 is positioned underneath the charging station 30.

Note that in the above-described examples, the placement of the magnetic field transmissive components 15, 25, and 35 should be also altered such that the power-supplying coil or the power-receiving coil are positioned inside of the magnetic field transmissive components 15, 25, and 35.

According to the above-described structure of the present invention, because the ascending/descending station 20 ascends and descends underwater between the depth where the underwater moving body 10 works and the vicinity of the surface 2, and because the underwater moving body 10 moves adjacent to the ascending/descending station 20 at this depth, and electrical power is supplied wirelessly from the ascending/descending station 20 to the underwater moving body 10, either one or a plurality of the underwater moving bodies 10 only has to move at the depth at which the underwater moving bodies 10 work (for example, in the vicinity of the bottom of water 1). Because of this, each underwater moving body 10 is able to alternate between performing its mission and recharging its battery, and does not need to ascend to the vicinity of the water surface 2. Accordingly, the operating efficiency of the underwater mobile body 10 is improved.

Note that the present invention is not limited to the above-described embodiments, and that various modifications and alterations can be made without departing from the scope of the appended claims and their equivalents. Namely, the present invention is not limited by the foregoing description and is only limited by the scope of the appended claims.

INDUSTRIAL APPLICABILITY

According to the underwater power supply system of the present invention, because it is possible to supply electrical power underwater to an underwater moving body without the underwater moving body having to ascend to the vicinity of the water surface, the operating efficiency of the underwater moving body is improved.

REFERENCE SIGNS LIST

1 ... Bottom of water
2 ... Water surface
10 ... Underwater moving body (Underwater vehicle, underwater robot, underwater exploration robot)
11 ... Main body
12 ... First rechargeable battery
13 ... First power-receiving coil
14 ... First power-receiving circuit
15 ... Magnetic field transmissive component
19 ... Movement control device
20 ... Ascending/descending station
21 ... Main body
22 ... Second rechargeable battery
23 ... Second power-receiving coil
24 ... Second power-receiving circuit
25 ... Magnetic field transmissive component
26 ... Second power-supplying coil
27 ... Second power-supplying circuit
28 ... Power-reception/power-supply circuit
29 ... Signal emitter
30 ... Charging station
31 ... External electrical power supply
35 ... Magnetic field transmissive component
36 ... First power-supplying coil
37 ... First power-supplying circuit
40 ... Ascending/descending apparatus
41 ... Anchor
42 ... Guide cable
44 ... Raising/lowering device
45 ... Hoisting winch

The invention claimed is:

1. An underwater power supply system that supplies electrical power underwater to one or a plurality of underwater moving bodies, the system comprising:
   an ascending/descending station that ascends and descends underwater between a water depth at which the underwater moving body works and the vicinity of the water surface, and has a rechargeable battery, a power-receiving coil and a power-supplying coil; and
   a charging station that supplies electrical power wirelessly to the ascending/descending station in the vicinity of the water surface, wherein,
   at the water depth, the underwater moving body moves adjacent to the ascending/descending station, and electrical power is supplied wirelessly from the ascending/descending station to the underwater moving body.

2. The underwater power supply system according to claim 1, wherein
   the underwater moving body has: a first rechargeable battery; a first power-receiving coil; a first power-receiving circuit that supplies electrical power from the first power-receiving coil to the first rechargeable battery; and a moving device by which the underwater moving body moves underwater,
   the charging station has: a first power-supplying coil; and a first power-supplying circuit that is connected to an external electrical power supply and drives the first power-supplying coil in a voltage/current waveform that is suitable for a wireless power supply, and the ascending/descending station has: a second rechargeable battery which is said rechargeable battery of the ascending/descending station; a second power-receiving coil which is said power-receiving coil of the ascending/descending station; a second power-supplying coil which is said power-supplying coil of the ascending/descending station; a power-reception/power-supply circuit that supplies electrical power from the second power-receiving coil to the second rechargeable battery, and that is connected to the second rechargeable battery and drives the second power-supplying coil in a voltage/current waveform that is suitable for a wireless power supply; and an ascending/descending apparatus by which the ascending/descending station ascends and descends underwater.

3. The underwater power supply system according to claim 2, wherein the ascending/descending station is provided with a signal emitter that outputs a signal indicating the position of the second power-supplying coil, and the underwater moving body is provided with a movement control device that controls the moving device, by receiving the signal, such that the first power-receiving coil is positioned at a previously set distance away from the second power-supplying coil so as to form an electromagnetic coupling circuit between the first power-receiving coil and the second power-supplying coil.

4. The underwater power supply system according to claim 2, wherein the ascending/descending apparatus has an anchor that is positioned on the bottom of water, a guide cable that connects the anchor to the charging station and extends in a vertical direction, and a raising/lowering device that raises and lowers a main body of the ascending/descending station underwater.

5. The underwater power supply system according to claim 2, wherein the first power-receiving coil, the second power-receiving coil, and the second power-supplying coil are provided inside of a magnetic field transmissive component made of a material that has watertightness and pressure resistance to withstand the water pressure at the depth at which the underwater moving body works and that allows an electromagnetic field for wireless power supply to pass through the magnetic field transmissive component.

6. An underwater power supply system that supplies electrical power underwater to one or a plurality of underwater moving bodies, the system comprising:

an ascending/descending station that ascends and descends underwater between a water depth at which the underwater moving body works and the vicinity of the water surface; and a charging station that supplies electrical power wirelessly to the ascending/descending station in the vicinity of the water surface, wherein at the water depth, the underwater moving body moves adjacent to the ascending/descending station, and electrical power is supplied wirelessly from the ascending/descending station to the underwater moving body, the underwater moving body has: a first rechargeable battery; a first power-receiving coil; a first power-receiving circuit that supplies electrical power from the first power-receiving coil to the first rechargeable battery; and a moving device by which the underwater moving body moves underwater, the charging station has: a first power-supplying coil; and a first power-supplying circuit that is connected to an external electrical power supply and drives the first power-supplying coil in a voltage/current waveform that is suitable for a wireless power supply, and the ascending/descending station has: a second rechargeable battery; a second power-receiving coil; a second power-supplying coil; a power-reception/power-supply circuit that supplies electrical power from the second power-receiving coil to the second rechargeable battery, and that is connected to the second rechargeable battery and drives the second power-supplying coil in a voltage/current waveform that is suitable for a wireless power supply; and an ascending/descending apparatus by which the ascending/descending station ascends and descends underwater.

7. The underwater power supply system according to claim 6, wherein the ascending/descending station is provided with a signal emitter that outputs a signal indicating the position of the second power-supplying coil, and the underwater moving body is provided with a movement control device that controls the moving device, by receiving the signal, such that the first power-receiving coil is positioned at a previously set distance away from the second power-supplying coil so as to form an electromagnetic coupling circuit between the first power-receiving coil and the second power-supplying coil.

8. The underwater power supply system according to claim 6, wherein the ascending/descending apparatus has an anchor that is positioned on the bottom of water, a guide cable that connects the anchor to the charging station and extends in a vertical direction, and a raising/lowering device that raises and lowers a main body of the ascending/descending station underwater.

9. The underwater power supply system according to claim 6, wherein the first power-receiving coil, the second power-receiving coil, and the second power-supplying coil are provided inside of a magnetic field transmissive component made of a material that has watertightness and pressure resistance to withstand the water pressure at the depth at which the underwater moving body works and that allows an electromagnetic field for wireless power supply to pass through the magnetic field transmissive component.

* * * * *